(12) United States Patent
Dudar

(10) Patent No.: US 10,013,821 B1
(45) Date of Patent: *Jul. 3, 2018

(54) EXHAUST GAS ANALYSIS

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/458,204

(22) Filed: Mar. 14, 2017

(51) Int. Cl.
| | | |
|---|---|---|
| G05D 1/00 | (2006.01) |
| G07C 5/08 | (2006.01) |
| F01N 11/00 | (2006.01) |
| G05D 1/02 | (2006.01) |
| G08G 1/16 | (2006.01) |
| G07C 5/00 | (2006.01) |
| B64C 39/02 | (2006.01) |

(52) U.S. Cl.
CPC .......... *G07C 5/0808* (2013.01); *B64C 39/024* (2013.01); *F01N 11/007* (2013.01); *G05D 1/0088* (2013.01); *G05D 1/0291* (2013.01); *G07C 5/008* (2013.01); *G08G 1/161* (2013.01); *B64C 2201/146* (2013.01); *F01N 2560/12* (2013.01)

(58) Field of Classification Search
USPC .......................................................... 701/23
See application file for complete search history.

(56) References Cited

U.S. PATENT DOCUMENTS

| | | | |
|---|---|---|---|
| 8,352,111 B2 | 1/2013 | Mudalige | |
| 2015/0232097 A1* | 8/2015 | Luther | .................... B61L 3/006 |
| | | | 701/123 |
| 2016/0068156 A1 | 3/2016 | Horii | |
| 2017/0122841 A1* | 5/2017 | Dudar | .................. B60W 40/02 |
| 2018/0023497 A1* | 1/2018 | Dudar | .................. F02D 41/222 |

FOREIGN PATENT DOCUMENTS

| | | |
|---|---|---|
| CN | 103808723 A | 5/2014 |
| DE | 10222071 A1 | 12/2003 |
| DE | 102009041487 A1 | 5/2010 |
| JP | 2004331019 A | 11/2004 |
| KR | 1020090122168 A | 11/2009 |

\* cited by examiner

*Primary Examiner* — Tyler D Paige
(74) *Attorney, Agent, or Firm* — Frank A. MacKenzie; Bejin Bieneman PLC

(57) ABSTRACT

A computer programmed to transmit a message from a vehicle to a second vehicle, including a request to analyze exhaust gas, receiving a message at the vehicle from the second vehicle including exhaust gas analysis, and pilot the vehicle based on the exhaust gas analysis.

20 Claims, 5 Drawing Sheets

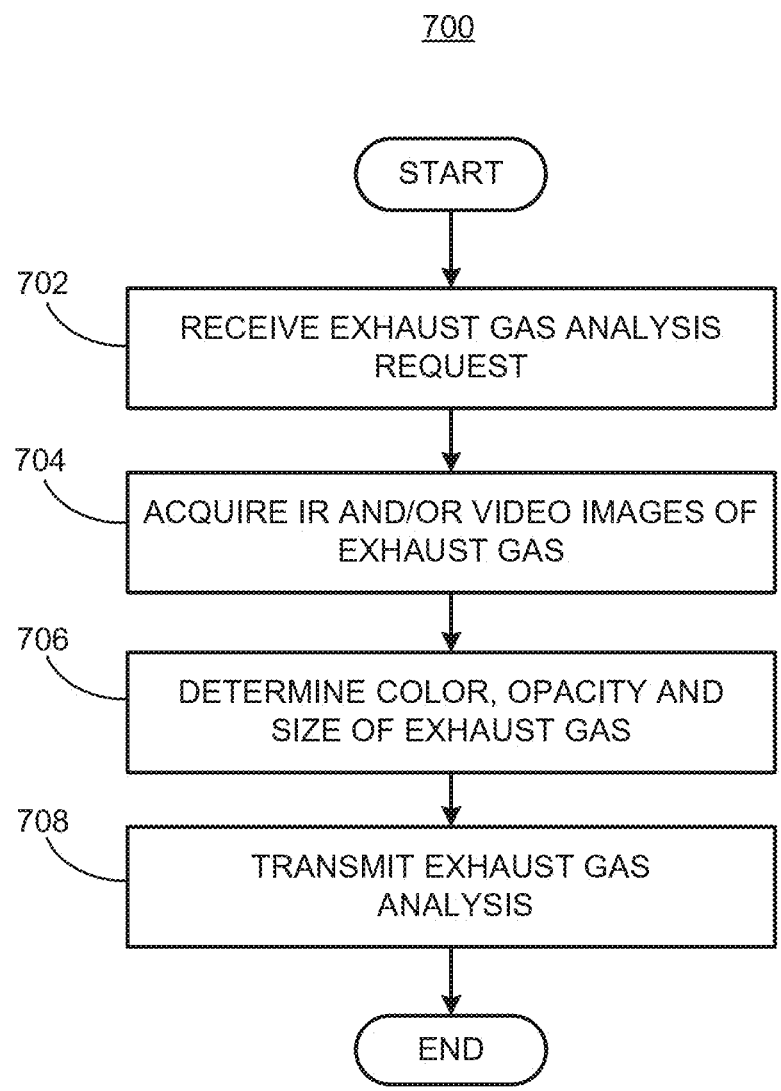

EXHAUST GAS ANALYSIS

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. A vehicle can also be equipped with computing devices, networks, sensors and controllers to transmit, receive and store information to and from other vehicle's computing devices and infrastructure computing devices. Information transmitted and received from other vehicles and traffic infrastructure computing devices can be required for safe and efficient operation of the vehicle in some traffic scenes, such as vehicle platooning, for example.

BRIEF DESCRIPTION OF THE DRAWINGS

FIG. 7 is a flowchart diagram of an example process for exhaust gas analysis.

DETAILED DESCRIPTION

Figure 1:
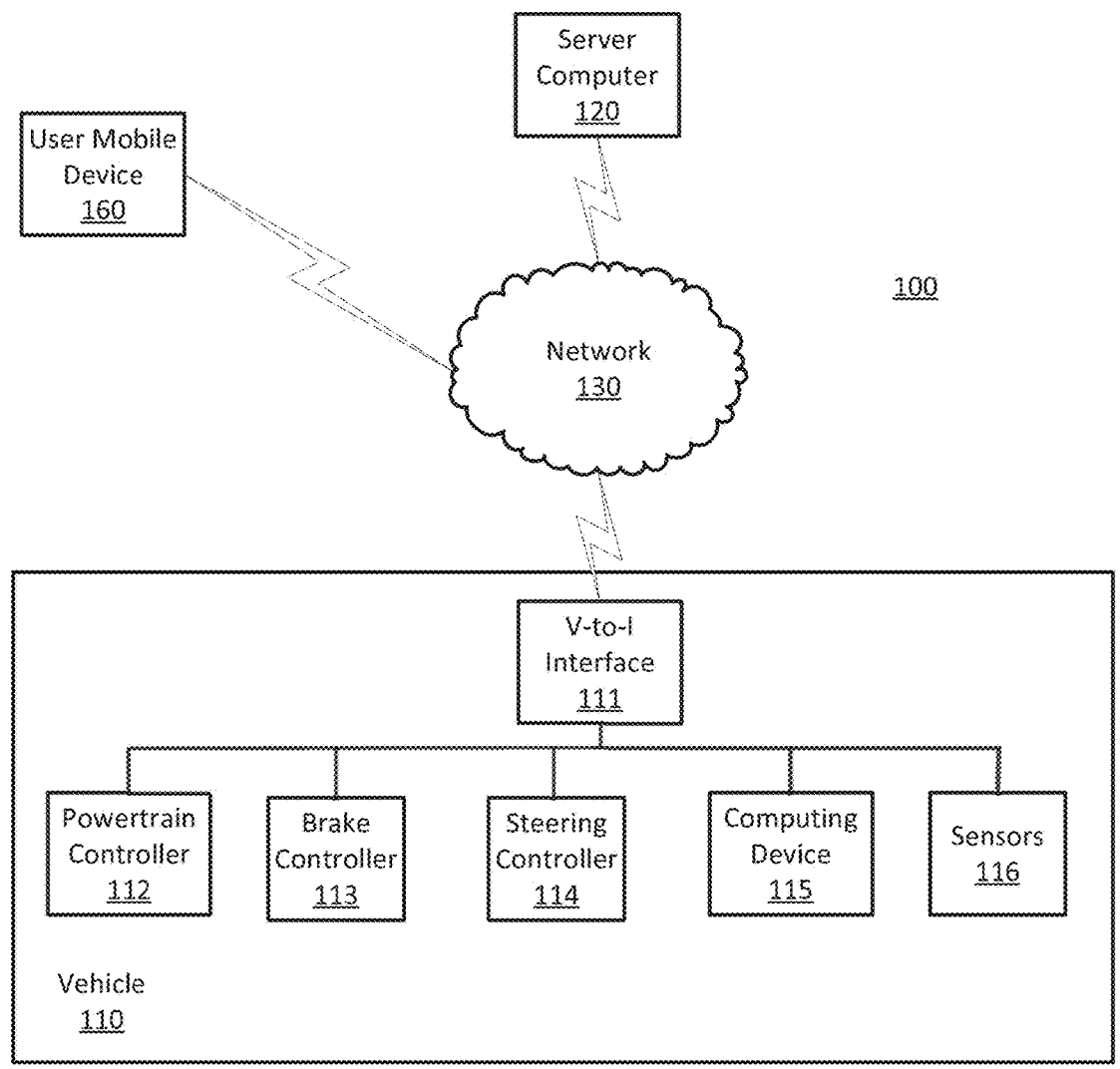
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real, i.e., physical, world including features such as roads. Vehicles can be piloted and maps can be determined based on locating and identifying features in the surrounding real world. By piloting we mean directing the movements of a vehicle so as to move the vehicle along a roadway or other portion of a path.

Disclosed herein is a method, comprising transmitting a message from a vehicle to a second vehicle, including a request to analyze exhaust gas, receiving a message at the vehicle from the second vehicle, including an exhaust gas analysis, and piloting the vehicle based on the exhaust gas analysis. The vehicle and the second vehicle can be in a platoon, wherein the vehicle and the second vehicle rely on vehicle-to-vehicle (V-to-V) communications and autonomous control to maintain a distance of less than about one meter between the vehicle and the second vehicle while traveling and the vehicle and the second vehicle can leave and rejoin the platoon while traveling.

The vehicle can change position in the platoon with the second vehicle and the second vehicle can transmit a message to the vehicle including a request to analyze exhaust gas. The second vehicle can receive a message including a second exhaust gas analysis, and pilot the second vehicle based on the second exhaust gas analysis. The vehicle can transmit the message based on determining that a vehicle fault exists, wherein the vehicle fault can include engine running lean, engine running rich, RPM is rough, engine misfire or cylinder power imbalance.

The exhaust gas analysis can include acquiring color video images and/or infrared video images of exhaust gas. The exhaust gas analysis includes determining exhaust gas color, opacity and size, based on color video images and/or infrared video images of exhaust gas, determining exhaust gas color includes distinguishing white, black and blue/grey gas, and determining exhaust opacity and extent includes comparing color video and/or infrared video images of exhaust gas to color video and/or infrared images without exhaust gas. The vehicle can change an engine control parameter to change exhaust gas to be detectable by exhaust gas analysis and the engine control parameter can include fuel/air mixture, wherein changing the fuel/air mixture to rich causes exhaust gas to become black. The vehicle changes engine control parameters to change exhaust gas in a pattern detectable by exhaust gas analysis by the second vehicle.

Further, the method of the exhaust gas analysis by the second vehicle can include determining a pattern of the exhaust gas by determining the color, opacity, extent, and temporal duration of the exhaust gas. The second vehicle can be an aerial drone launched from the vehicle and the second vehicle can transmit the exhaust gas analysis to a computing device at a remote location from the vehicle.

Further disclosed is a computer readable medium storing program instructions for executing some or all of the above method steps. Further disclosed is a computer programmed for executing some or all of the above method steps.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
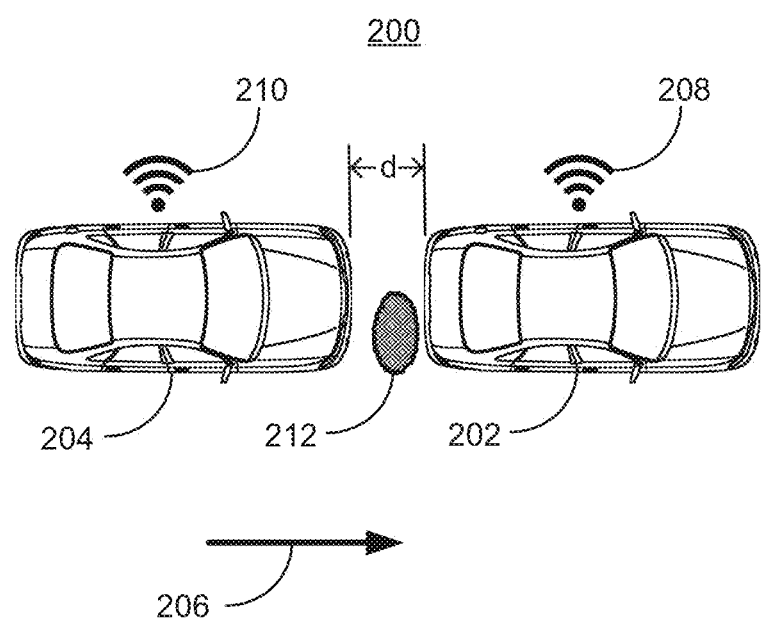
FIG. 2 is a diagram of an example traffic scene with two vehicles.

FIG. 2 is a diagram of a traffic scene 200, with two example vehicles 202, 204. The two vehicles can be in a platoon, where a platoon is two or more vehicles 202, 204 having vehicle-to-vehicle (V-to-V) network interfaces 208, 210, respectively to link vehicles 202, 204 via a V-to-V network to permit the vehicles 202, 204 to platoon, or travel while closely spaced. In traffic scene 200, vehicles 202, 204 are traveling in direction 206, separated by a distance d, which can be about 1 meter, for example. V-to-V network communication, wherein computing devices 115 in vehicles 202, 204 can communicate using low-power, local-area networking protocols such as BLUETOOTH® low energy (BLE) via V-to-V network interfaces 208, 210, can permit vehicles 202, 204 to start, accelerate, decelerate and stop in unison, thereby increasing the capacity of roads and increasing safety by eliminating sources of human error. Platooning can increase fuel economy by reducing air resistance, reduce traffic congestion in big cities, provide shorter commuting time during peak traffic hours, and permit occupants to be inattentive to driving at times, for example, highway trips.

Vehicle 202 can have onboard diagnostics that indicate to computing device 115 in vehicle 202 that engine performance is degraded. There are many causes of engine performance degradation, including: engine running lean, engine running rough, RPM is variable, engine misfire and cylinder power imbalance, etc. All of these root causes can result in the same diagnostic, "check engine" code reported to computing device 115. Some of these root causes can be further diagnosed by an occupant pilot and/or computing device 115 in autonomous mode. In addition to these diagnostic measures, analysis of exhaust gas of vehicle 202 can provide additional information regarding a "check engine" code that can determine the correct action for vehicle 202 to take to preserve the safety of vehicle 202 and the safety of vehicles around vehicle 202.

Vehicle 204 can be equipped with high-resolution color video cameras as sensors controlled by a computing device 115 in vehicle 204. One or more of these video cameras can acquire images of exhaust gas 212 emitted by vehicle 202 and perform an analysis of the exhaust gas and transmit the analysis to vehicle 202 via a V-to-V network. Since computing device 115 in vehicle 202 requested the exhaust gas analysis, computing device 115 can determine engine and vehicle control parameters that will produce the most useful exhaust gas for analysis. For example, the quantity of exhaust gas emitted from vehicle 202 can be related to engine load, e.g. acceleration, gradient climbing, etc., therefore computing device 115 can apply a higher load to vehicle 202 when exhaust gas analysis is requested.

Figure 3:
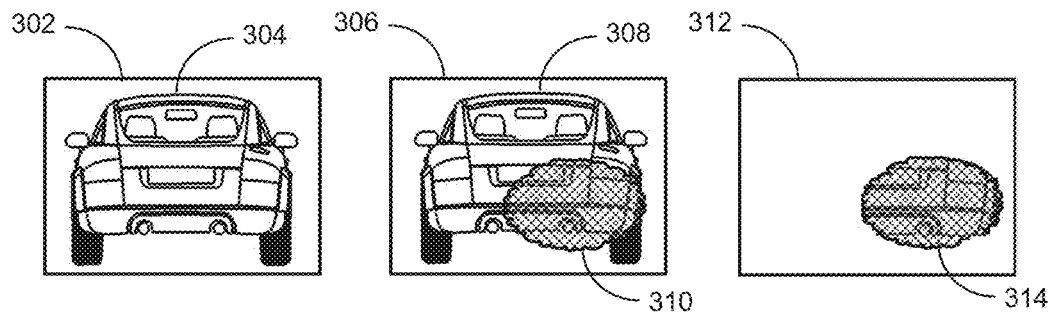
FIG. 3 is a diagram of three example frames of video data.

FIG. 3 is a diagram showing three example frames 302, 306, 312 of color video data. In the first frame 302, an image of a rear view of a vehicle 304 is visible. In the second frame 306, an image of a vehicle 308 is visible, with a cloud of exhaust gas 310. In video frame 312, image data from the first video frame 302 is subtracted from image data from the second video frame 306 to form third video frame 312, where exhaust gas 314 is proportional to a difference between first video frame 302 and second video frame 306. Third video frame 312 can be processed using known machine vision processing to determine opacity, the size and the color in the cloud of exhaust gas 314.

Opacity in general is a measure of a percentage of light transmitted through a medium. In the present context, opacity of exhaust gas can be defined as the percent transmission of background detail, as measured by the image detail of the vehicle 304 visible through the exhaust gas 314, compared to image detail of vehicle 304 visible in video frame 302, for example. Size can be determined by measuring the size of the cloud of exhaust gas 314 in third video frame 312 in pixels, and then converting the pixel count to absolute values by using machine vision techniques to determine the size of the vehicle 304 in first video frame 302 and comparing the measured size of vehicle 304 to a predetermined size for vehicle 304 stored in non-volatile memory in a computing device 115. Color can be determined by grouping pixels according to their values in RGB color space, using statistical techniques such as maximum likelihood estimation to group pixels into a finite set of color values, for example.

Figure 4:
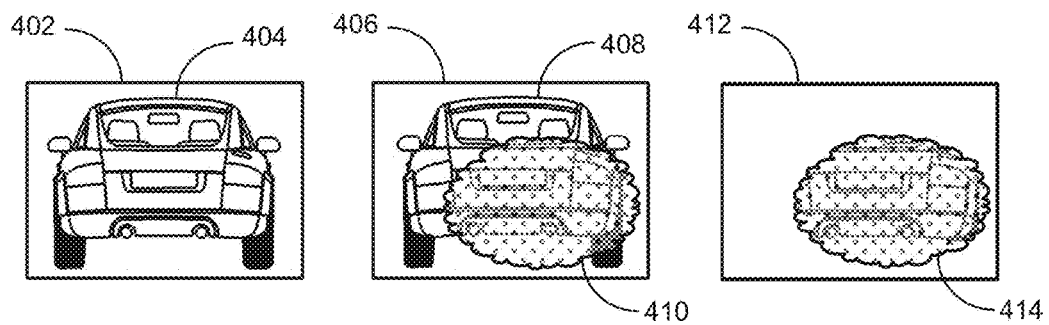
FIG. 4 is a diagram of three example frames of video data.

FIG. 4 is a diagram showing three example frames 402, 406, 412 of color video data. As in FIG. 3, in the first frame 402, an image of a rear view of a vehicle 404 is visible. In the second frame 406, an image of a vehicle 408 is visible, with a cloud of exhaust gas 410. In video frame 412, image data from the first video frame 402 is subtracted from image data from the second video frame 406 to form third video frame 412, where cloud of exhaust gas 414 visible. In this example, cloud of exhaust gas 414 is less opaque, larger sized and white in color as compared to cloud of exhaust gas 314, which is opaque, medium-sized, and colored blue.

Figure 5:
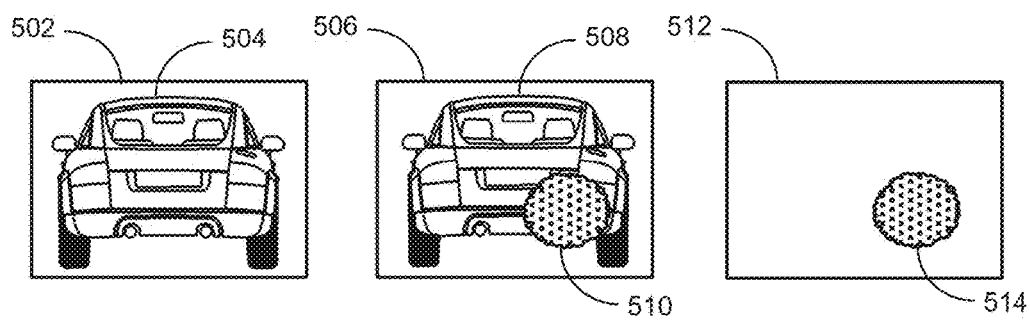
FIG. 5 is a diagram of three example frames of video data.

FIG. 5 is a diagram showing three example frames 502, 506, 512 of color video data. As in FIGS. 3 and 4, in the first frame 502, an image of a rear view of a vehicle 504 is visible. In the second frame 506, an image of a vehicle 508 is visible, with a cloud of exhaust gas 510. In video frame 512, image data from the first video frame 502 is subtracted from image data from the second video frame 506 to form third video frame 512, where cloud of exhaust gas 514 visible. In this example, cloud of exhaust gas 514 is more opaque, smaller sized and black in color as compared to clouds of exhaust gas 314, 414.

Analyzing exhaust gas by determining the size, opacity and color of clouds of exhaust gas can provide information regarding vehicle operating conditions. For example, black exhaust gas can be indicative of a vehicle engine running rich, which can be caused by a leaky injector, bad heated exhaust gas oxygen sensor (HEGO), or leaky coolant pressure valve (CPV). White exhaust gas can be indicative of coolant inside the combustion chamber, for example caused by a leaking head gasket. Blue exhaust gas is indicative of engine oil entering the combustion chamber, which could be caused by worn piston rings, for example. Gray is a normal color for exhaust gas. In order of severity, white exhaust gas is the most concerning, followed by blue exhaust gas, then black exhaust gas. Grey exhaust gas is of no concern and will occasionally form under normal circumstances.

Analyzing exhaust gas by determining the size, opacity and color of clouds of exhaust gas can also depend upon the type of engine with which a vehicle 304, 404, 504 can be equipped. For example, the color classification described above can be operative for vehicles 304, 404, 504 equipped with gasoline-powered internal combustion engines. Vehicles 304, 404, 504 equipped with diesel-powered internal combustion engines emit black exhaust gas occasionally under normal circumstances, for example. The vehicle 202 engine type can be included in the message requesting exhaust gas 212 analysis, for example.

Returning to FIG. 2, platooning vehicle 204 as shown in FIG. 2 can perform an analysis of exhaust gas 212 as described in relation to FIGS. 3-5 to determine opacity, size and color of exhaust gas 212. The resulting analysis can be transmitted to vehicle 202 via a V-to-V network and transmitted to a fleet owner or dispatch station associated with vehicle 202 for further action when vehicle 202 arrives at its destination or home garage. Parts can be ordered and service procedures scheduled based on the transmitted exhaust gas analysis, for example.

Vehicle 202 can communicate with vehicle 204 via exhaust gas. For example, exhaust gas 212 color and quantity can be controlled by computing device 115 in vehicle 202 changing engine parameters to richen the fuel/air mixture. Making the mixture rich can cause thick, black exhaust gas 212 to form. Computing device 115 can change engine parameters over time to change the rate, color and density of exhaust gas 212 emitted from vehicle 202 in a deliberate fashion to communicate with vehicle 204 in the absence of other communication.

For example, as vehicle 204 is traveling in traffic scene 200, vehicle 204 will be continuously inputting video data via video sensors as described above in relation to FIG. 1. This video data will include frames 302, 402, 502 including a rear view of vehicles 304, 404, 504 from time to time. In this example, vehicles 202 and 204 may not be platooning. In this case, vehicles 202, 204 can be traveling in traffic scene 200, without being in V-to-V communication. Many reasons exist for vehicles 202, 204 being unable to communicate via V-to-V networking, despite being equipped with V-to-V network interfaces 208, 210. For example, the signal can be lost due to local radio interference, computing device 115 can drop communications due to higher priority tasks, or a local area V-to-V network can be temporarily overloaded with messages, much like cellular telephone networks become overloaded and drop calls, etc.

Computing device 115 in vehicle 202 can control engine parameters to emit dark, black gas. Vehicle 204, in the absence of a message from vehicle 202 requesting exhaust gas analysis, can continuously monitor video frames 302, 402, 502 including a rear view of vehicles 304, 404, 504. If computing device 115 in vehicle 204 determines that vehicle 202 is emitting a cloud of black exhaust gas 514, computing device 115 in vehicle 204 can determine that vehicle 202 is sending a message via exhaust gas. The meaning associated with the message can be dependent upon the context in which it is sent and received.

For example, if vehicle 202 determines that vehicle 204 is following too closely, and electronic V-to-V communication is not currently available, a cloud of thick, black exhaust gas 514 could be used to send a message to vehicle 204 indicating that vehicle 202 determined that vehicle 204 was tailgating and requests that vehicle 204 provide more space d between vehicles. In another case, vehicle 202 could be parked at a roadside, disabled and needing assistance, where the disablement includes disabled V-to-V and V-to-I network communications, for example. Computing device 115 in vehicle 202 could determine that vehicle 204 was approaching from the rear and control engine parameters to emit a cloud of black exhaust gas 514. Computing device 115 in vehicle 204, in the absence of V-to-V communications from vehicle 202, can determine that vehicle 202 was emitting a cloud of thick, black exhaust gas 514 and in this context, determine that the cloud of thick, black gas 514 was a distress message, and contact appropriate authorities via V-to-I network interface 111.

In either case, computing device 115 in vehicle 202 can adjust engine parameters to emit a recognizable cloud of black exhaust gas in a temporal pattern that can be recognized by other vehicles without receiving a request to analyze exhaust gas from vehicle 202. For example, vehicle 202 can emit puffs of thick, black gas interspersed with short periods of no thick, black gas, forming a temporal pattern of exhaust gas "dots" that can represent an emergency signal.

In another case, vehicle 204 can be an aerial drone, launched from vehicle 202, for example. The aerial drone vehicle 204 can include a computing device 115, a video camera and a V-to-V network link 210 to the vehicle 202 via V-to-V network link 208. The aerial drone vehicle 204 can view vehicle 202 emitted exhaust gas 212 from the air, perform an exhaust gas analysis as described above and transmit the exhaust gas analysis to the vehicle 202, or the aerial drone vehicle 204 can transmit raw video data to computing device 115 in vehicle 202 via V-to-V network interfaces 208, 210 for exhaust gas analysis by computing device 115.

Figure 6:
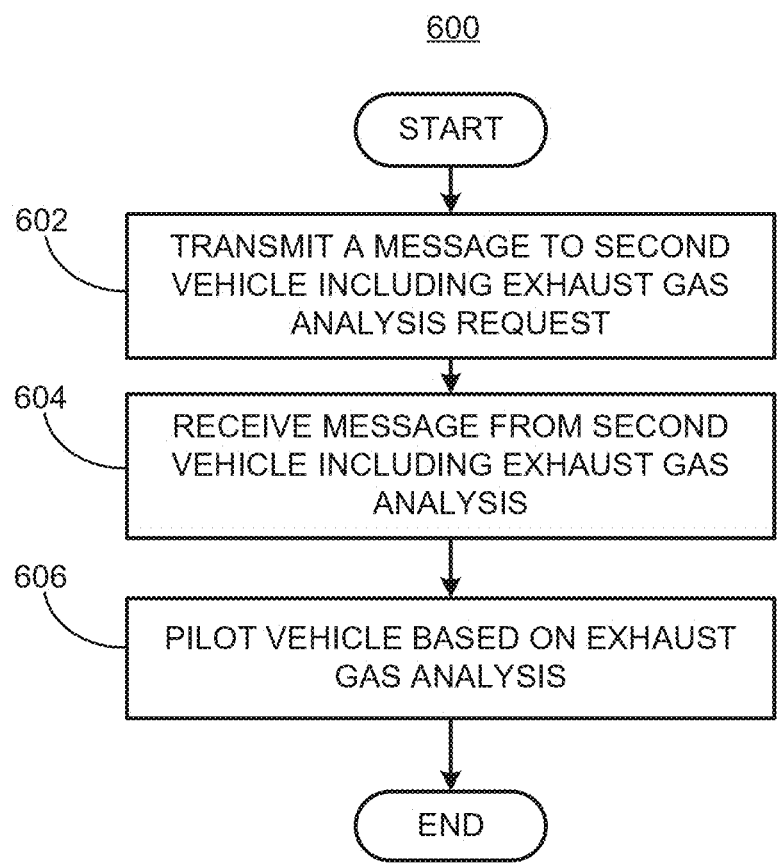
FIG. 6 is a flowchart diagram of an example process for exhaust gas analysis.

FIG. 6 is a diagram of a flowchart, described in relation to FIGS. 1-5, of a process 600 for piloting a vehicle based on exhaust gas analysis, e.g., as described above. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 begins at step 602, where a vehicle 202 can transmit a message to a second vehicle 204 including a request to perform an exhaust gas 212 analysis. The message can be transmitted in response to a "check engine" status received by computing device 115 in vehicle 202 and transmitted via a V-to-V network as discussed above in relation to FIG. 2.

At step 604 vehicle 202 can receive a message from vehicle 204 via the V-to-V network including an exhaust gas 212 analysis. The exhaust gas 212 analysis can be performed by computing device 115 in vehicle 204 based on color video information as described in relation to FIGS. 3-5, above and the exhaust gas 212 analysis transmitted in a message to computing device 115 in vehicle 202 via V-to-V network interfaces 208. 210. Computing device 115 can also transmit the exhaust gas 212 analysis in a message to a computing device 115 associated with an owner, service provider, or fleet manager, etc. in cases where vehicle 202 is autonomously piloted, for example.

At step 606 computing device 115 in vehicle 202 can pilot vehicle 202 based on the received exhaust gas 212 analysis. For example, an exhaust gas 212 analysis that indicated profuse, white exhaust gas 414 emitting from vehicle 202 can indicate a coolant leak, wherein vehicle 202 should be safely parked as soon as possible. In other cases, dense blue exhaust gas 314 emitting from vehicle 202 can indicate long-term engine wear issues, for example cylinder rings, that should be repaired as soon, but does not require immediate parking to avoid further damage.

In other cases, an exhaust gas 212 analysis that indicated excessive amounts of exhaust gas of any color can indicate that further information regarding the state of vehicle 202 can be acquired by safely parking vehicle 202 and acquiring audio data from exhaust gas 212 using microphone sensors connected to computing device 115 in vehicle 202. The audio data can be analyzed by computing device 115 to further diagnose the "check engine" status. For example, some conditions that cause "check engine" status can also cause a recognizable change in the sound patterns associated with exhaust gas 212.

In summary, process 600 describes a process wherein a computing device in vehicle 202 transmits a message to a computing device 115 in a second vehicle 204 including a request to analyze exhaust gas 212, receives a message from the second vehicle 204 including an exhaust gas 212 analysis, and pilots vehicle 204 based on the exhaust gas 212 analysis.

FIG. 7 is a diagram of a flowchart, described in relation to FIGS. 1-5, of a process 700 for exhaust gas analysis. Process 700 can be implemented by a processor of computing device 115, taking as input information from sensors 116, and executing instructions and sending control signals via controllers 112, 113, 114, for example. Process 700 includes multiple steps taken in the disclosed order. Process 700 also includes implementations including fewer steps or can include the steps taken in different orders.

Process 700 starts at step 702, where a computing device 115 in second vehicle 204 receives an exhaust gas analysis request from vehicle 202 via V-to-V network interfaces 208, 210. At step 704, computing device 115 in second vehicle 204 can acquire color video data using color video sensors as described above in relation to FIG. 2, above. At step 706, computing device 115 can perform exhaust gas 212 analysis to determine the color, opacity and size of a cloud of exhaust gas 314, 414, 514 associated with vehicle 202, and at step 708, computing device 115 in vehicle 202 can transmit, via V-to-V network interfaces 208, 210, the exhaust gas 212 analysis, including color, opacity and size. Computing device 115 can also determine a temporal pattern associated with the exhaust gas 212 by analyzing changes in exhaust gas color, opacity and size over time.

In summary, process 700 is a process for receiving a request, at a computing device 115 in a second vehicle 204, to perform exhaust gas 212 analysis. Computing device 115 in second vehicle 204 performs the exhaust gas 212 analysis and transmits the exhaust gas 212 analysis to vehicle 202 via V-to-V network interfaces 208, 210.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

I claim:

1. A method, comprising:
   transmitting a message from a vehicle to a second vehicle, including a request to analyze exhaust gas;
   receiving a message at the vehicle from the second vehicle, including an exhaust gas analysis; and
   piloting the vehicle based on the exhaust gas analysis.

2. The method of claim 1, wherein the vehicle and the second vehicle are in a platoon, wherein the vehicle and the second vehicle rely on vehicle-to-vehicle communications and autonomous control to maintain a distance of less than about one meter between the vehicle and the second vehicle while traveling.

3. The method of claim 2, wherein the vehicle, and the second vehicle, leave and rejoin the platoon while traveling.

4. The method of claim 2, wherein the vehicle changes position in the platoon with the second vehicle;
   the second vehicle transmits a message to the vehicle including a request to analyze exhaust gas;
   the second vehicle receives a message including a second exhaust gas analysis; and
   piloting the second vehicle based on the second exhaust gas analysis.

5. The method of claim 1, wherein the vehicle transmits the message based on determining a vehicle fault exists, wherein the vehicle fault includes engine running lean, engine running rich, RPM is rough, engine misfire or cylinder power imbalance.

6. The method of claim 1, wherein the exhaust gas analysis includes acquiring color video images and/or infrared video images of exhaust gas.

7. The method of claim 6 wherein the exhaust gas analysis includes determining exhaust gas color, opacity and size, based on color video images and/or infrared video of exhaust gas.

8. The method of claim 7 wherein determining exhaust gas color includes distinguishing white, black and blue/grey gas, and determining exhaust opacity and extent includes comparing color video and/or infrared video images of exhaust gas to color video and/or infrared images without exhaust gas.

9. The method of claim 8, wherein the vehicle changes an engine control parameter to change exhaust gas to be detectable by exhaust gas analysis.

10. The method of claim 9, wherein the engine control parameter includes fuel/air mixture, wherein changing the fuel/air mixture to rich causes exhaust gas to become black.

11. The method of claim 10, wherein the vehicle changes engine control parameters to change exhaust gas in a pattern detectable by exhaust gas analysis by the second vehicle by determining the color, opacity, extent, and temporal duration of the exhaust gas.

12. The method of claim 1, wherein piloting the vehicle includes acquiring audio data from the exhaust gas using a microphone at engine idle.

13. The method of claim 1, wherein the second vehicle is an aerial drone launched from the vehicle.

14. The method of claim 1, wherein the second vehicle transmits the exhaust gas analysis to a computing device at a remote location from the vehicle.

15. A system, comprising a computer, programmed to:
transmit a message from a vehicle to a second vehicle, including a request to analyze exhaust gas;
receive a message at the vehicle from the second vehicle, including an exhaust gas analysis; and
pilot the vehicle based on the exhaust gas analysis.

16. The computer of claim 15, further programmed to pilot the vehicle to change position in a platoon with the second vehicle;
receive, from the second vehicle, a message including a request to analyze exhaust gas; and
send to the second vehicle a message including a second exhaust gas analysis.

17. The computer of claim 15, further programmed to transmit the message based on determining a vehicle fault exists, wherein the vehicle fault includes an engine running lean, engine running rich, RPM is rough, engine misfire or cylinder power imbalance.

18. The computer of claim 15, wherein the computer is further programmed to determine exhaust gas color, opacity and extent, based on one of infrared images and color video images of exhaust gas, as part of the exhaust gas analysis.

19. The computer of claim 15, wherein the computer is further programmed to change an engine control parameter to change exhaust gas to be detectable by exhaust gas analysis.

20. The computer of claim 19, wherein the engine control parameter includes fuel/air mixture, wherein changing the fuel/air mixture to rich causes exhaust gas to become black.

* * * * *